(12) United States Patent
Asahara et al.

(10) Patent No.: US 7,522,997 B2
(45) Date of Patent: Apr. 21, 2009

(54) NAVIGATION APPARATUS

(75) Inventors: Akinori Asahara, Kokubunji (JP);
Shigeru Shimada, Kodaira (JP);
Kishiko Maruyama, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 11/735,601

(22) Filed: Apr. 16, 2007

(65) Prior Publication Data

US 2007/0244635 A1  Oct. 18, 2007

(30) Foreign Application Priority Data

Apr. 17, 2006  (JP)  .............. 2006-113615

(51) Int. Cl.
*G01C 21/00*  (2006.01)

(52) U.S. Cl. .............. 701/210; 701/208; 701/209; 340/905; 340/995.19

(58) Field of Classification Search .............. 701/115, 701/200, 201, 207–210, 212; 340/995.1, 340/995.13, 995.17, 995.21, 995.22, 905, 340/995.19
See application file for complete search history.

(56) References Cited

U.S. PATENT DOCUMENTS

| | | | | |
|---|---|---|---|---|
| 5,220,507 | A * | 6/1993 | Kirson ................ | 701/202 |
| 5,521,826 | A * | 5/1996 | Matsumoto .......... | 701/208 |
| 5,991,689 | A * | 11/1999 | Aito et al. ............ | 701/209 |
| 6,064,941 | A * | 5/2000 | Nimura et al. ....... | 701/210 |
| 6,212,473 | B1 * | 4/2001 | Stefan et al. ......... | 701/210 |
| 6,256,579 | B1 * | 7/2001 | Tanimoto ............. | 701/201 |
| 6,321,161 | B1 * | 11/2001 | Herbst et al. ........ | 701/210 |
| 6,505,118 | B2 * | 1/2003 | Chowanic et al. ... | 701/209 |
| 6,732,048 | B2 * | 5/2004 | Blewitt ................ | 701/210 |
| 7,076,505 | B2 * | 7/2006 | Campbell ............. | 707/104.1 |
| 7,356,407 | B2 * | 4/2008 | Johnson et al. ...... | 701/209 |
| 2002/0052689 | A1 | 5/2002 | Yamashita et al. | |
| 2004/0236507 | A1 | 11/2004 | Maruyama et al. | |

(Continued)

FOREIGN PATENT DOCUMENTS

EP  0587892  3/1994

(Continued)

OTHER PUBLICATIONS

European Search Report, EP 07007813.4-1236, Aug. 8, 2007.

*Primary Examiner*—Matthew Lichti
(74) *Attorney, Agent, or Firm*—Mattingly, Stanger, Malur & Brundidge, PC

(57) ABSTRACT

A controller of a navigation terminal (navigation apparatus) is configured to find a plurality of paths from a current position of a vehicle and a destination based on a plurality of different and prioritized path-finding conditions, respectively, and causes a display to show the plurality of paths which includes a navigating path found on the basis of a top-priority path-finding condition and at least one alternative path found on the other path-finding condition(s). In response to detection of deviation of the vehicle, the priority assigned to a path-finding condition based on which a specific alternative path along which the vehicle is running is changed into a top priority, and path-finding operation is performed again for paths from the current position of the vehicle to the destination to show a new navigating path and at least one new alternative path in the display.

8 Claims, 15 Drawing Sheets

U.S. PATENT DOCUMENTS

| | | |
|---|---|---|
| 2005/0080558 A1* | 4/2005 | Kasai ........................ 701/209 |
| 2005/0149253 A1* | 7/2005 | Nambata ..................... 701/201 |
| 2006/0184317 A1 | 8/2006 | Asahara et al. |
| 2006/0220923 A1 | 10/2006 | Tanizaki et al. |
| 2008/0294330 A1* | 11/2008 | Sasano ........................ 701/117 |

FOREIGN PATENT DOCUMENTS

| | | |
|---|---|---|
| EP | 0811960 | 12/1997 |
| EP | 1550843 | 7/2005 |
| EP | 1635141 | 3/2006 |
| EP | 1734339 | 12/2006 |
| JP | 2004-061356 | 2/2004 |
| JP | 2005-017052 | 1/2005 |
| WO | 2005/093372 | 10/2005 |

* cited by examiner

FIG.8
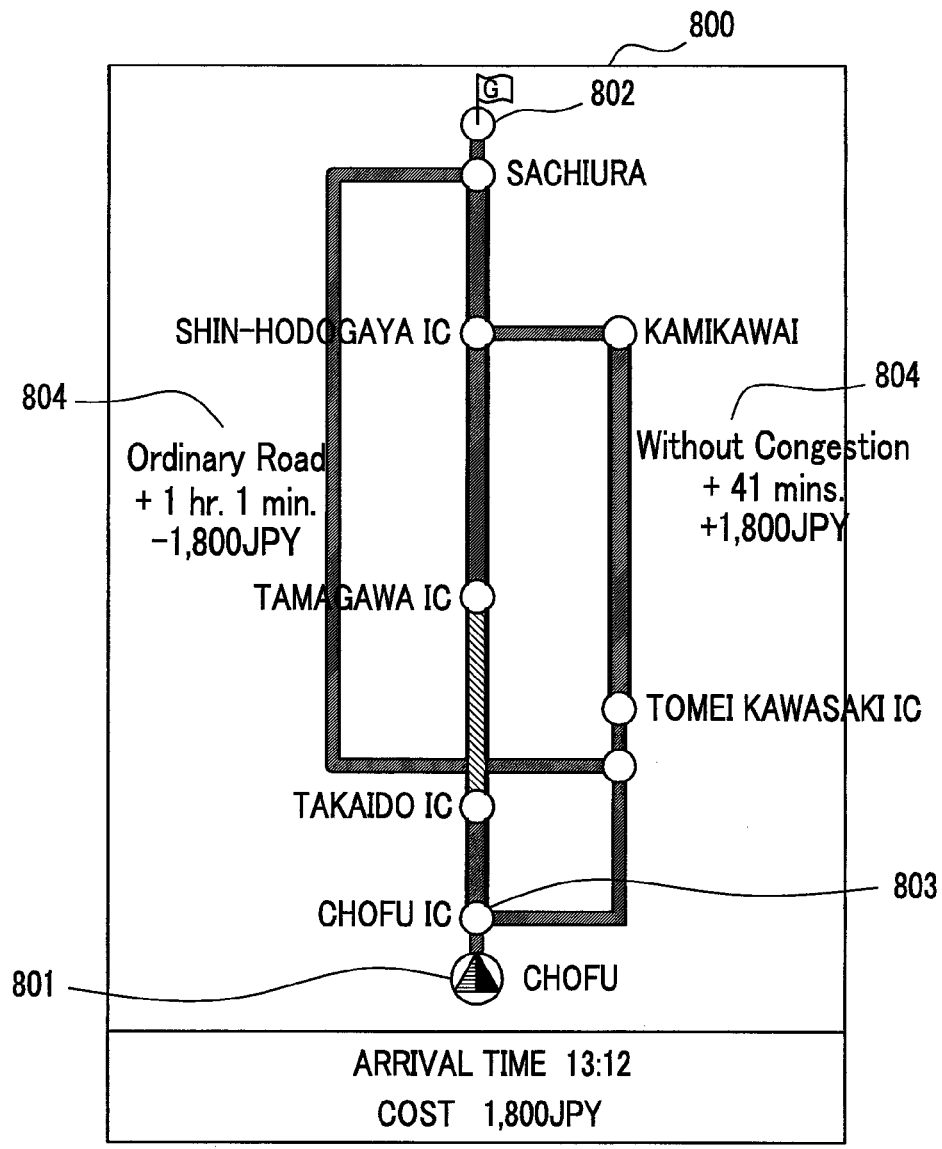
|  | MARK OF CURRENT POSITION |  PATH (ORDINARY ROAD) |
|  | BRANCH POINT OR FREEWAY JUNCTION |  PATH (FREEWAY) |
|  | MARK OF DESTINATION |  PATH (PART WITH CONGESTION) |

# NAVIGATION APPARATUS

CROSS-REFERENCE TO RELATED APPLICATION(S)

This application claims the foreign priority benefit under Title 35, United States Code, § 119 (a)-(d), of Japanese Patent Application No. 2006-113615, filed on Apr. 17, 2006 in the Japan Patent Office, the disclosure of which is herein incorporated by reference in its entirety.

BACKGROUND OF THE INVENTION

1. Field of the Invention

This invention relates to a navigation apparatus which displays a path to a destination on a map to thereby guide a driver of a vehicle along the path to be followed.

2. Description of the Related Art

The navigation apparatus for a vehicle is configured to show in a display a map on which a navigating path such as a shortest-time path is designated, and/or relevant information, to suggest a road suitable for a driver of the vehicle to drive along. The driver of the vehicle may make predetermined settings at the navigation apparatus in which he/she can select a preferable type of navigating path among various alternatives such as a shortest-time path, a shortest-distance path, and a freeway-detouring path.

Conventionally, the path-finding algorithm for determining a navigating path is based on a single condition, and thus only one navigating path is displayed at the navigation apparatus. In recent years, however, another type of navigation apparatuses, for example as disclosed in [Patent Document 1], proposes that when navigation is started for example by a driver specifying his/her destination at the navigation apparatus, path-finding operations are performed on a plurality of conditions to display a plurality of navigating paths resulting from the operations. This type of the navigation apparatuses allows the driver to check the plurality of navigating paths on the map before selecting a path to be followed among the suggested alternatives.

A still another type of navigation apparatuses, for example as disclosed in [Patent Document 2], proposes a reroute function that permits a driver to change the navigating path from a path which is currently being traveled to another path. With this navigation apparatus having such a reroute function, even when an accident or the like takes place on the navigating path the driver has initially selected, the driver can perform a path-finding operation again on his/her way to set a new path to be followed.

<References Cited>

[Patent Document 1]: JP 2005-17052 A
[Patent Document 2]: JP 2004-61356 A

Incidentally, a driver of a vehicle may wish to change the path-finding condition while driving along a specific navigating path. For example, there is often the case where the driver considers that he/she may use a toll road up to a specific point but does not wish to use one from the specific point onward. What the navigation apparatus disclosed in [Patent Document 1] achieves is merely that a plurality of paths determined on the basis of different path-finding conditions are displayed when the navigation is started at the point of departure or the like. Accordingly, in order to display alternative paths determined on the basis of different path-finding conditions during driving at some midpoint on his/her way to the destination, the driver may be required to stop the vehicle, and then (or even when the driver does not have to stop the vehicle, irrespectively) he/she may be required to operate and instruct the navigation apparatus to perform an updating path-finding operation.

On the other hand, the navigation apparatus disclosed in [Patent Document 2] is configured to automatically execute a reroute operation to display an alternative path when the vehicle is likely to deviate from a navigating path. In this configuration, the driver can follow the alternative path at will. However, the alternative path suggested in this instance is a second path found on the basis of the same condition as that on which the originally suggested navigating path was based. Accordingly, the navigation apparatus disclosed in [Patent Document 2] would not fulfill the driver's need for changing the path-finding conditions (e.g., from a path including a toll road to a path avoiding any toll road).

The present invention has been made in an attempt to overcome the aforementioned drawbacks in the existing technologies. It would thus be considered desirable to provide a navigation apparatus which allows a driver to change a path-finding condition at will without any operation at the navigation apparatus while a vehicle is running along a navigating path suggested on the basis of a specific path-finding condition, and to follow any alternative path suggested on the basis of a different path-finding condition at will.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to a navigation apparatus installed in a vehicle. The navigation apparatus comprises: a display for showing information graphically; an input interface for receiving an instruction from an operator; a locator configured to identify a current position of the vehicle; and a controller. The controller is configured: (1) to find a plurality of paths from the current position of the vehicle identified by the locator to a destination input by the operator and received through the input interface, based on a plurality of different path-finding conditions, respectively; (2) to cause the display to show the plurality of paths which comprise a navigating path found on the basis of a top-priority path-finding condition and at least one alternative path found on the basis of a path finding condition other than the top-priority path-finding condition; (3) to change priorities assigned to the path-finding conditions in response to detection of deviation of the vehicle based on the current position identified by the locator, wherein if the current position indicates that the vehicle is running along a specific alternative path, then the priority assigned to a pass-finding condition based on which the specific alternative path has been found is changed into the top priority, and a path-finding for a plurality of updated paths from the current position of the vehicle to the destination; and (4) to cause the display to show the plurality of updated paths which comprise an updated navigating path and at least one updated alternative path.

According to an exemplary embodiment of the present invention, a driver may be allowed to change a path-finding condition at will without any operation at the navigation apparatus while a vehicle is running along a navigating path suggested on the basis of a specific path-finding condition, and to follow any alternative path presented on the basis of a different path-finding condition at will.

BRIEF DESCRIPTION OF THE DRAWINGS

The above and other aspects or advantages and further features of the present invention will become more apparent by describing in detail illustrative, non-limiting embodiments thereof with reference to the accompanying drawings, in which:

FIG. 8 is a diagram showing a second display example of the navigation screen displayed in the display of the navigation apparatus according to an exemplary embodiment of the present invention;

DETAILED DESCRIPTION OF THE EXEMPLARY EMBODIMENTS

A detailed description of exemplary embodiments of the present invention will be given hereafter with reference to the accompanying drawings.

Figure 1:
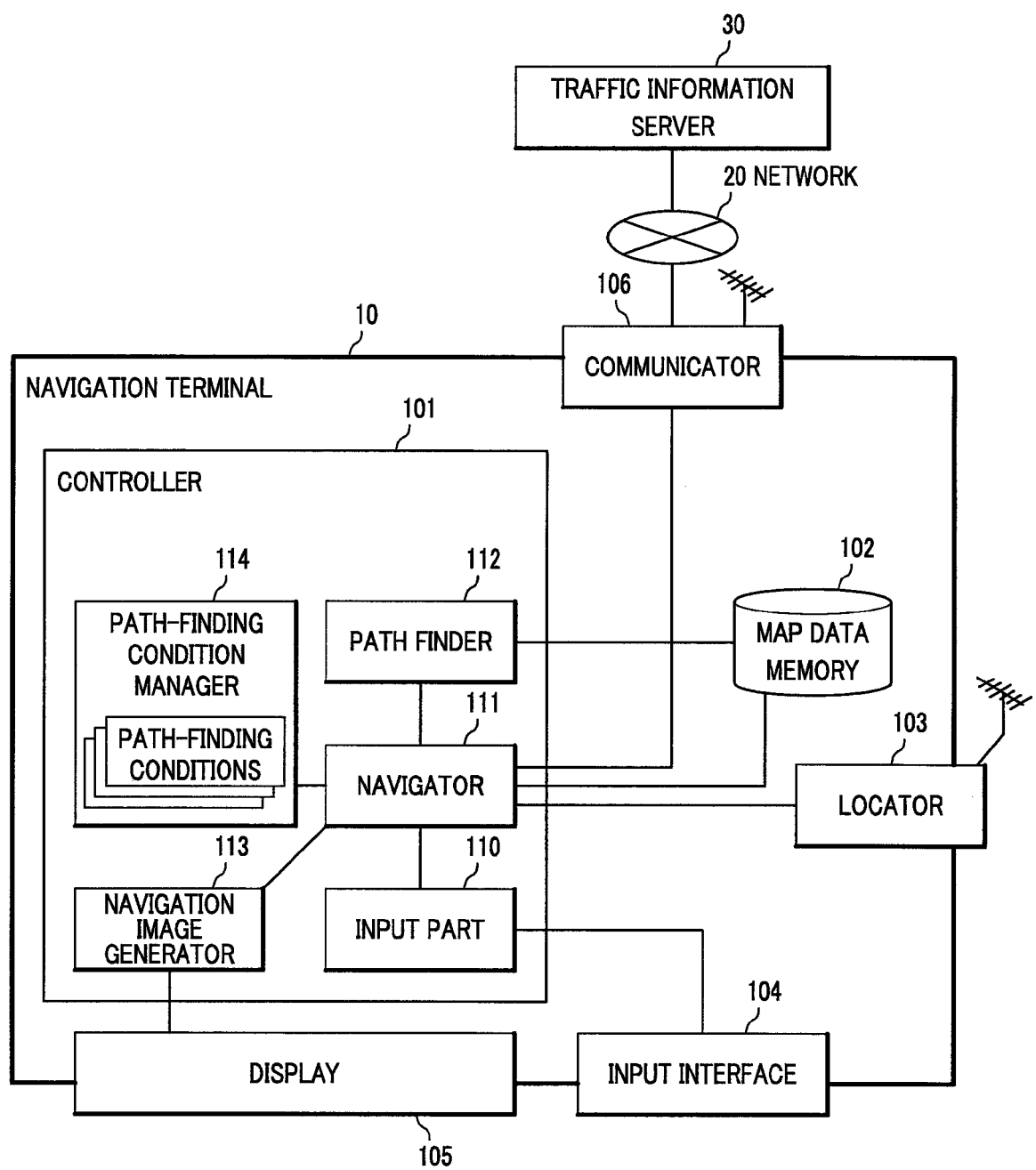
FIG. 1 is a block diagram showing an exemplified structure of a navigation apparatus (navigation terminal) according to an exemplary embodiment of the present invention.

As shown in FIG. 1, a navigation terminal (navigation apparatus) 10 in an exemplary embodiment includes a controller 101, a map data memory 102, a locator 103, an input interface 104, a display 105, a communicator 106, and other components.

The controller 101 is implemented in a computer which includes a processor and a memory (not shown). The controller 101 is configured to cause the processor to execute predetermined programs stored in the memory, and to thereby activate functions of functional blocks which include an input part 110, a navigator 111, a path finder 112, a navigation image generator 113, a path-finding condition manager 114 and other components (not shown). The functions of these functional blocks will be described later in detail.

The map data memory 102 in this embodiment is comprised of a hard disk drive, a digital versatile disk (DVD) or the like, and configured to store predetermined map data. The map data include data concerning shapes of roads and connection between the roads, data concerning positions of coastlines and place names, etc. In the map data, unique identifiers (IDs) are assigned to junctions and roads (the roads herein refer to road segments each connecting one junction and another junction adjacent thereto), respectively, so that each path is represented by an array of the IDs of the junctions and the roads.

The locator 103 in this embodiment includes a GPS (global positioning system) receiver and the like, and is configured to get current position information of a vehicle in which the navigation terminal 10 is installed, on an as-needed basis. The input interface 104 in this embodiment includes a button, a dial, a touch-panel switch, etc. and is configured to receive an instruction from a driver (operator of the navigation terminal 10). The display 105 in this embodiment is comprised of a liquid crystal display or the like, and configured to show a map including a navigating path suggested, or other information. The display 105 is provided with a touch panel used as an input interface 104 in many instances.

The communicator 106 is configured to establish connection with a traffic information server 30 and the like via a network 20 such as the cellular phone networks, the Internet, etc. and to receive traffic information such as traffic congestion statuses of the roads transmitted from the traffic information server 30. The communicator 106 may be connected with a map distribution server (not shown) via the network 20.

The navigation terminal 10 may further include a voice output part (not shown) comprised of a speaker and the like, to output voice messages for the purposes of navigation and information concerning facilities, features, etc. located along the navigating path.

Referring now to FIG. 1, an operation of the navigation terminal 10 is outlined by explaining a process executed by the controller 101.

Upon receipt of information on a destination, etc. input by a driver (operator) through the input interface 104, the controller 101 first receives the input information by means of the input part 110, and starts a process in the navigator 111.

The controller 101 then activates the process in the navigator 111 to get from the path-finding condition manager 114 a plurality of path-finding conditions and their priorities that are currently set therein. Hereupon, a path-finding condition having the highest priority is called "top-priority path-finding condition". The controller 101 (navigator 111) is also configured to get from the locator 103 information on a current position of the vehicle in which the navigation terminal 10 is installed. It is understood that the priorities may not necessarily be determined for all the path-finding conditions but the top priority path-finding condition is determined in any event.

The controller 101 executes a process in the path finder 112 to find paths from the current position to the destination based on the information on the current position, the destination and the top-priority path-finding condition that have been acquired as described above. Hereupon, the path found on the basis of the top-priority path finding condition is called "navigating path". Similarly, the other paths are found respectively on the basis of the other path-finding conditions, i.e., those other than the to top-priority path-finding condition. The paths found on the basis of the other path-finding conditions are called "alternative paths".

The controller 101 subsequently executes a process in the navigation image generator 113 to generate a map image containing a navigating path and alternative paths, and causes the display 105 to show the generated map image.

Figure 2:
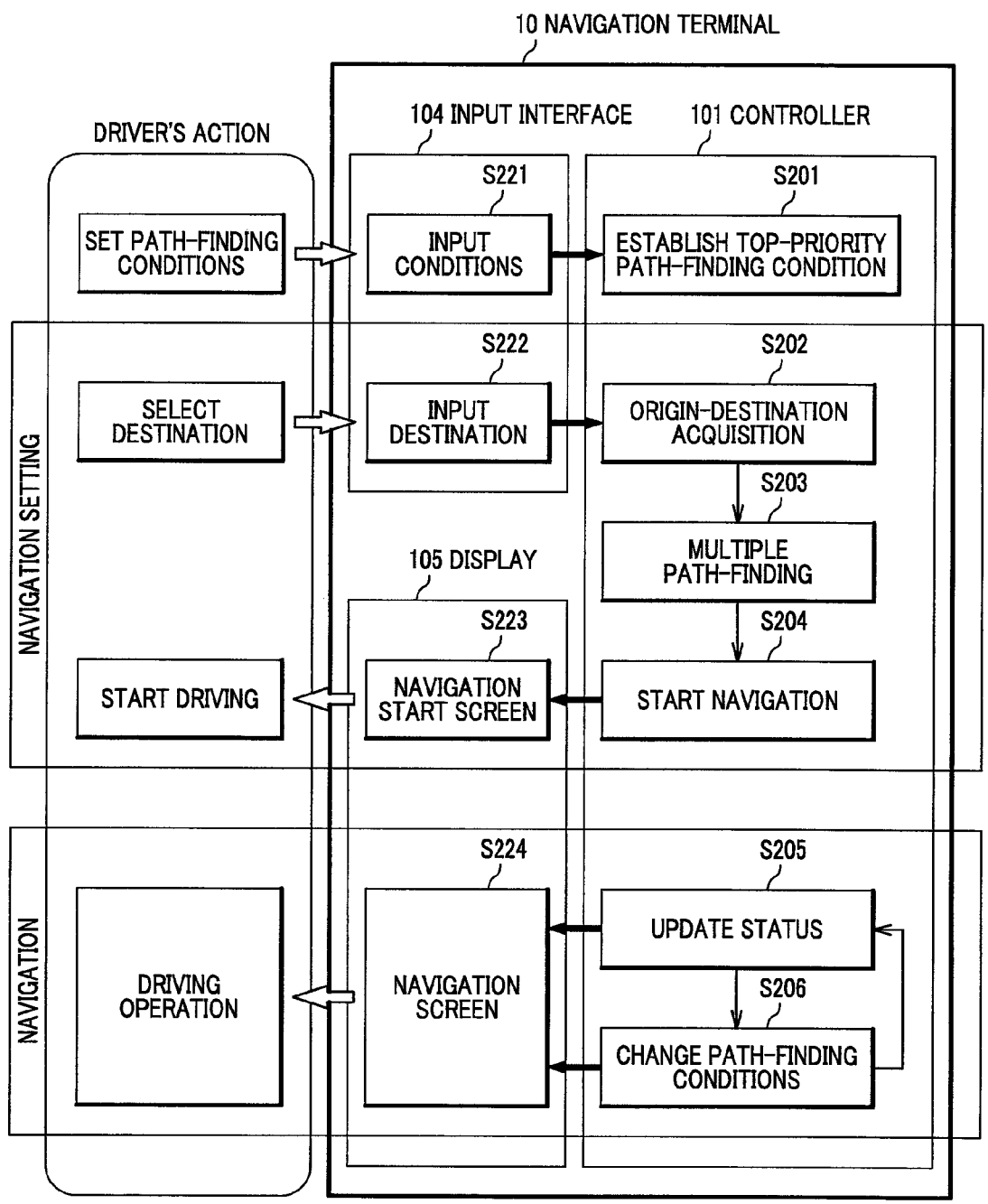
FIG. 2 is a schematic diagram showing an example of an operation flow of the navigation apparatus according to an exemplary embodiment of the present invention.

Turning to FIG. 2 et seqq., next described in detail are the operation of the navigation terminal 10 and the process in the controller 101. FIG. 2 shows by way of example an operation flow of the navigation terminal 10 (navigation apparatus) according to an exemplary embodiment of the present invention.

As shown in FIG. 2, the driver first makes a setting for path-finding conditions at the navigation terminal 10. At this stage, a plurality of path-finding conditions are selectably provided in accordance with drivers' typical path selecting criteria which for example include preferences to a toll road-detouring path, a dense traffic road-avoiding path, a wide road-prioritized path, and others. The driver operates the input interface 104 to enter (specify and submit) a plurality of prioritized path-finding conditions as input data (step S221). The controller 101 receives the input data, and establishes the top-priority path-finding condition (step S201).

The driver may not necessarily make such a setting for path-finding conditions, since the controller 101 may use a predetermined default setting for the path-finding conditions even if the driver fails to perform the operation of setting the path-finding conditions. This operation of setting the path-finding conditions may be performed at any time before the controller 101 starts navigation, for example, during a navigation setting process that will be described below.

The next process in the navigation terminal 10 performed prior to starting the navigation includes a process (hereinafter referred to as "navigation setting") of setting navigation conditions and retrieving navigating and other paths to be suggested.

To be more specific, the driver operates the input interface 104, i.e., selecting from a list of places (specifying and submitting) a place to which the driver intends to go, to input a destination (step S222). The controller 101 acquires an origin-and-destination pair of which the destination is received through the input interface 104 and a current position (origin) is derived from current position information received from the locator 103 and map data ("Origin-destination acquisition" in step S202). Next, the controller 101 executes a process of finding a plurality of paths from the current position to the destination ("Multiple path-finding" in step S203), based on the plurality of path-finding conditions that have been input in the preceding step. Based on the result of the multiple path-finding step, then, the controller 101 selects a path found on the basis of the top-priority path-finding condition, for a path to be suggested as a first choice (and to be displayed as "navigating path"), and causes the display 105 to show a navigation start screen 223 for informing the driver that the navigation has been started, to start navigation ("Start navigation" in step S204). The driver is thus informed by the navigation start screen 223 that the navigation has been started.

The controller 101 which has started navigation receives the current positions from the locator 103 at predetermined intervals; at each time when an updated current position is received, the controller 101 (in the navigation image generator 113) generates a display image in which a navigating path and alternative paths each extending from the updated current position to the destination are shown, for display in a navigation screen 224; and the controller 101 monitors the status as to whether or not the updated current position received is on the currently navigating path, and whether or not the path on which the vehicle is now running has been changed to any alternative path ("Update status" in step S205). Display examples of the navigation screen 224 will be described later in detail.

The driver sees the navigation screen 224 and normally drives the vehicle along the navigating path displayed therein. It is however within the driver's discretion which path the vehicle will go along, and the driver may thus drive the vehicle along an alternative path.

The controller 101 executes a process in the path-finding manager 114 to change the path-finding conditions if detection occurs such that the vehicle has entered one of the alternative paths displayed, in such a manner that the alternative path the vehicle has entered is changed to a new navigating path and the priority assigned to the path-finding condition based on which that alternative path has been found is changed into the top priority ("Change path-finding conditions" in step S206). At this stage, the controller 101 (in the path finder 112) retrieves new alternative paths based on the updated path-finding conditions, and (in the navigation image generator 113) generates a display image containing the new navigating path and the new alternative paths, for display in a navigation screen 224 (causing the display 105 to show the navigation screen 224).

If the vehicle has not entered any alternative path (i.e., when the vehicle goes along the navigating path, or when the vehicle goes along a path which is neither the navigating path nor the alternative paths displayed), it is necessary to update the navigating path and the alternative paths when the vehicle passes through a branch point at which the vehicle may go to any alternative path. Accordingly, the controller 101 retrieves the updated navigating and alternative paths, and generates a display image containing the updated navigating and alternative paths for display in the navigation screen 224 in a manner similar to the instance described above. It is understood that it is not necessary to retrieve the navigating path again, if the vehicle continues to go along the same navigating path.

As described above, the navigation terminal 10 according to the present embodiment is configured to cause the display 105 to always show a navigating path and at least one alternative path, and thus allows the driver to drive the vehicle at will, i.e., the driver may go along the navigating path or enter an alternative path whenever he/she likes. When the vehicle has entered a specific alternative path, the specific alternative path replaces the navigating path and becomes shown as a new navigating path; therefore, the top-priority path-finding condition in the path-finding conditions is changed as the driver likes without the need for his/her manipulation at the navigation terminal 10.

Figure 3:
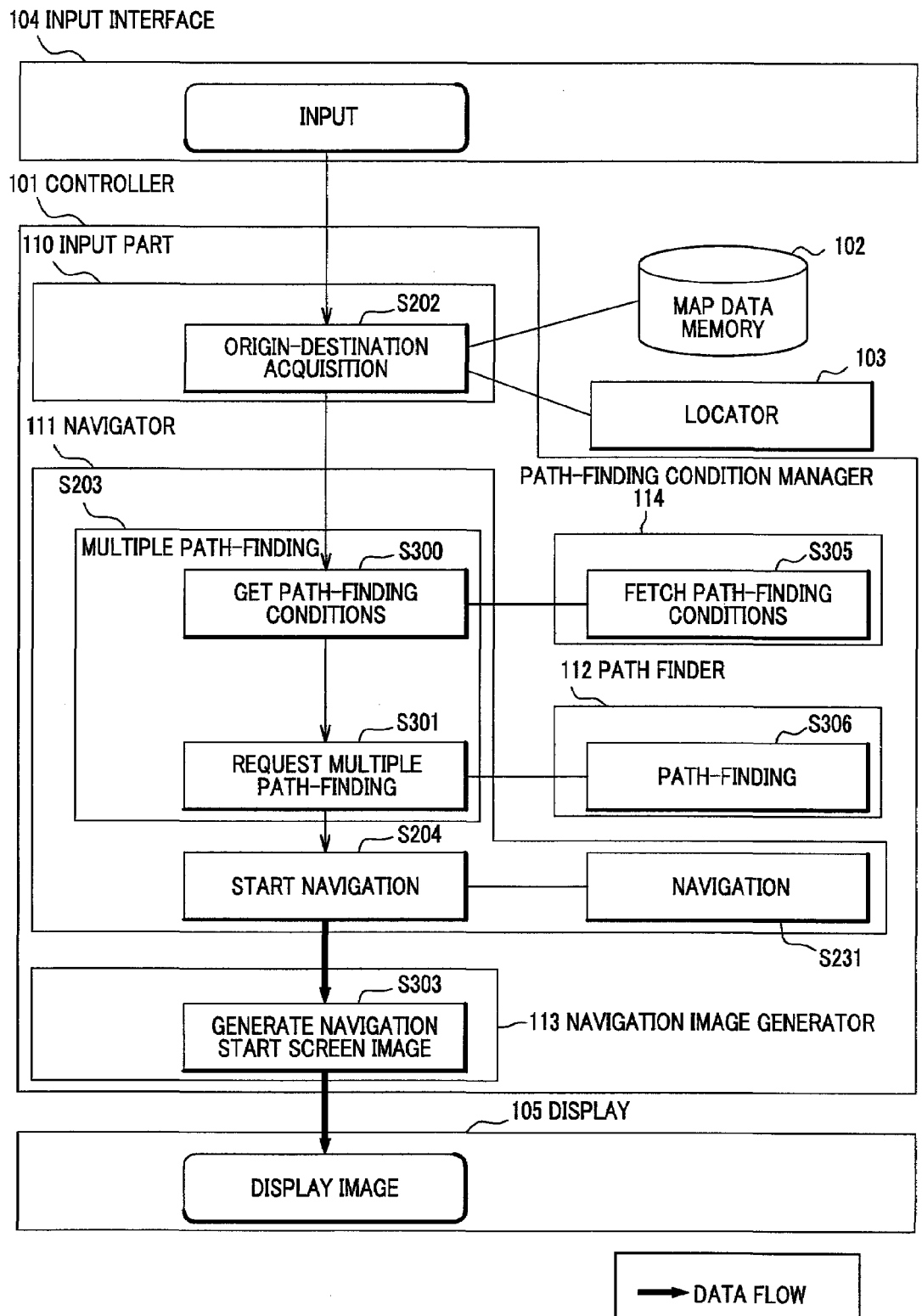
FIG. 3 is a schematic diagram showing an example of a detailed process flow of navigation settings in a controller of the navigation apparatus according to an exemplary embodiment of the present invention.

The operation of the navigation terminal 10 will be described hereafter in more detail. FIG. 3 is a schematic diagram showing an example of a detailed process flow of navigation settings in the controller 101 of the navigation terminal 10.

Referring to FIG. 3, once the destination is input (specified) in the input interface 104, the controller 101 executes the "Origin-destination acquisition" process in the input part 110 (step S202). Specifically, as described above, the controller 101 receives the destination through the input interface 104, receives the current position from the locator 103, and performs a lookup on the map data in the map data memory 102 with the current position received from the locator 103 to acquire information concerning the current position (the place name of the current position, etc.).

Next, the controller 101 executes a process in the navigator 111 to find multiple paths starting from the received current position and ending at the received destination in step S203. In this "Multiple path-finding" process (step S203), "Get path-finding conditions" (step S300) and "Request multiple path-finding" (step S301) processes are performed, so that multiple paths are retrieved.

Here, in the "Get path-finding conditions" process (step S300), the controller 101 first requests the path-finding condition manager 114 to get path-finding conditions and their priorities. In response to the request, the path-finding condition manager 114 of the controller 101 executes a "Fetch path-finding conditions" process (step S305) to fetch a plurality of path-finding conditions that are currently set therein. Then, the plurality of path-finding conditions are passed to the "Get path-finding conditions" process (step S300).

In the "Request multiple path-finding" process (step S301), the controller 101 requests the path finder 112 to find a plurality of paths from the current position to the destination on the basis of the plurality of path-finding conditions acquired in step S300. In response to the request, the path finder 112 of the controller 101 executes a "Path-finding" process (step S306) to generate information on the paths corresponding to the plurality of path-finding conditions. Methods applicable to the "Path-finding" process in step S306 may include the Dijkstra method or other path-finding methods known in the art. The information on each path generated in the "Path-finding" process may be represented by an array of identifiers of the roads and junctions through which the path from the current position to the destination passes.

Next, the controller 101 executes a "Start navigation" process (step S204) in the navigator 111 to start a "Navigation" process (step S231) for which the generated information on the plurality of paths is provided, and invokes the navigation image generator 113 to execute a "Generate navigation start screen image" process (step S303). The details of the "Navigation" process (step S231) will be described below with reference to FIG. 4.

In the "Generate navigation start screen image" process (step S303), the controller 101 causes the display 105 to show a navigation start screen which indicates that the navigation has started, so as to notify the driver of a start of the navigation. In an embodiment where the navigation terminal 10 has a voice output device such as a speaker, notification of a start of the navigation may be given by a voice message.

Figure 4:
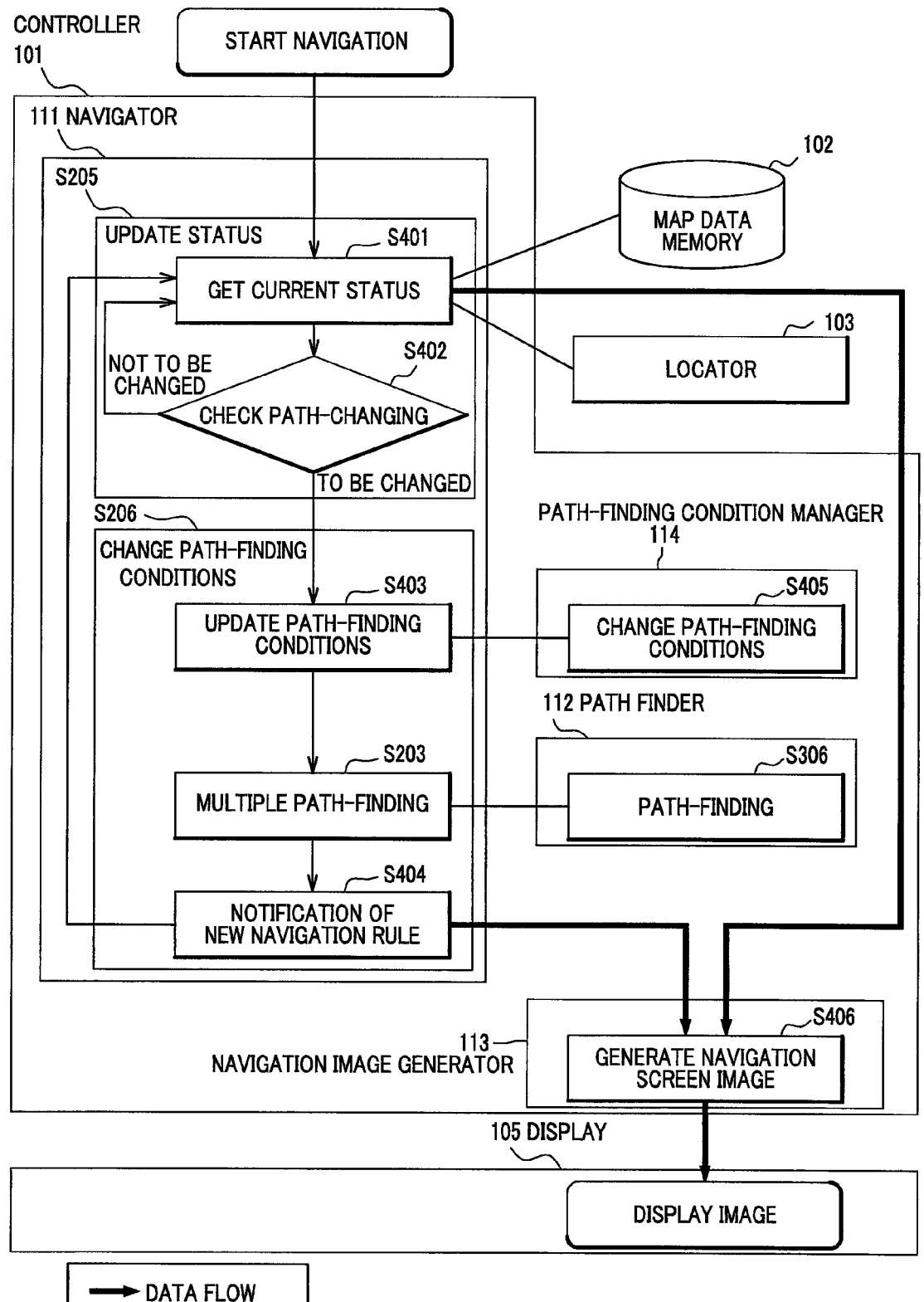
FIG. 4 is a schematic diagram showing an example of a detailed process flow of navigation in the controller of the navigation apparatus according to an exemplary embodiment of the present invention.

FIG. 4 is a schematic diagram showing an example of a detailed process flow of navigation in the controller 101 of the navigation terminal 10.

When the "Start navigation" process (step S204) is executed in the navigator 111, the "Navigation" process (step S231), which corresponds to steps S205 and S206 implemented in the navigator 111 (for detail, see FIG. 4), is started.

The controller 101 first executes an "Update status" process (step S205). In the "Update status" process (step S205), the controller 101 (navigator 111) executes a "Get current status" process (step S401) repeatedly at predetermined intervals. To be more specific, the controller 101 is configured to acquire information on the current positions from the locator 103 at predetermined intervals and to perform a lookup on the map data in the map data memory 102, so as to determine the current position of the vehicle at each time. The controller 101 then monitors the status as to whether or not the current position is on the currently suggested navigating path. The controller 101 is also configured to pass the information on the current position at each time to a "Generate navigation screen image" process (step S406) in the navigation image generator 113 so as to cause the display 105 to show a navigation screen containing a navigating path and at least one alternative path.

The controller 101 next (navigator 111) executes a "Check path-changing" process (step S402) in which the current position of the vehicle is located relative to the navigating path or the at least one alternative path to determine whether or not path-changing of the navigating path or the at least one alternative path is necessary. For example, if the current position has been deviated from the navigating path, it is determined that path-changing of the navigating path and the at least one alternative path has become necessary. If the current position is on a position immediately past a branch point for an alternative path but still along the navigating path, it is determined that path-changing of the at least one alternative path has become necessary.

If it is determined based on the result of the "Check path-changing" process (step S402) that path-changing of the navigating path and/or the at least one alternative path has become necessary, the controller 101 (navigator 111) executes a "Change path-finding conditions" process (step S206) that will be described below.

In the "Change path-finding conditions" process (step S206), the controller 101 (navigator 111) executes an "Update path-finding conditions" process (step S403) at the outset.

In the "Update path-finding conditions" process (step S403), it is determined whether or not the current position is on a alternative path, and if it is determined that the current position is on a specific alternative path, then the priority assigned to a pass-finding condition based on which the specific alternative path has been found is changed into the top priority. Thus, the newly established top-priority path-finding condition is provided to the path-finding condition manager 114, and the path-finding condition manager 114 executes a "Change path-finding conditions" process (step S405). If the current position is neither on the navigating path nor on any alternative path, the path-finding condition will not be changed. This is because when the driver has decided to go along a path other than the navigating and alternative paths displayed, it is impossible to determine which path-finding condition is preferred by the driver. However, the top-priority path-finding condition may be changed if it is possible to determine which path-finding condition is preferred by the driver, by any means other than that which is based on the fact that the current position is on any alternative path, for example when the driver has decided to get off from the freeway though the top priority is given to path-finding condition on which an freeway is preferred.

Next, the controller 101 (navigator 111) executes a "multiple path-finding" process (step S203), so that a new navigating path to be suggested and alternative paths associated therewith are retrieved on the basis of the updated current position and path-finding conditions. If it is not necessary to retrieve a new navigating path, a path-finding process for finding a navigating path may be omitted. The "Multiple path-finding" (step S203) process may be executed in the same manner as described above with reference to FIG. 3, in cooperation with the path finder 112; i.e., the "Path-finding" (step S306) process for the new navigating path and/or associated alternative paths are requested to the path finder 112.

When the new navigating path and/or associated alternative paths are found, the controller 101 (navigator 111) executes a "Notification of new navigation rule" process (step S404) so that the driver is notified that the navigating path and the associated alternative paths have been changed. At this stage, the controller 101 executes a "Generate navigation screen image" process (step S406) in the navigation image generator 113. To be more specific, the controller 101 (navigation image generator 113) generates a navigation screen image in which a navigating path and at least one alternative path are shown together with the current position, with a note added thereto to indicate that the navigating path and the at least one alternative path have been changed, so that the navigation screen is shown in the display 105. In an embodiment where the navigation terminal 10 has a voice output device such as a speaker, notification of a new navigation rule to the effect that the navigating path and the at least one alternative path have been changed may be given to the driver by a voice message.

Figure 5:
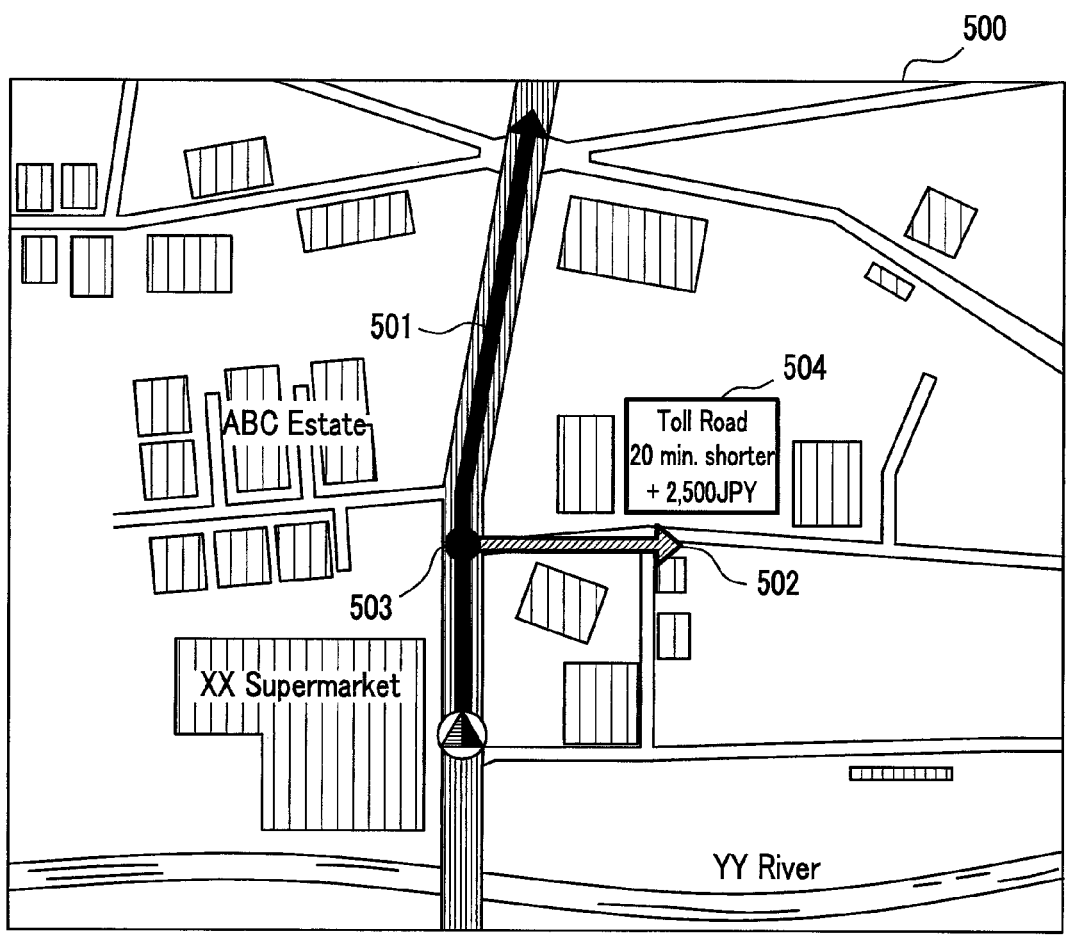
FIG. 5 is a diagram showing a first display example of a navigation screen displayed in a display of the navigation apparatus according to an exemplary embodiment of the present invention.

FIG. 5 is a diagram showing a first display example of the navigation screen displayed in the display 105 of the navigation terminal 10 according to the present embodiment. As shown in FIG. 5, in this example of the navigation screen 500 is shown a road map around the vehicle in which the navigation terminal 10 is installed, wherein a navigating path 502, an alternative path 502 and a branch point 503 therefor are superposed thereon.

In this example of the navigation screen 500, indication of the alternative path may not always be displayed therein, but configured to appear only after the vehicle comes sufficiently near the branch point 503, e.g., when the vehicle reaches a position that is a predetermined distance short of the branch point 502, by means of an arrow or the like. It is appreciated that the navigating path 501 and the alternative path 502 may not necessarily be indicated by arrows, but any means for indication, such as distinction in colors applied thereto, may be adopted as long as the indication clearly and distinctively shows these paths so that the driver can easily identify the navigating path and the alternative path, respectively.

The navigation screen 500 showing the alternative path 502 may also show path information 504, such as a message and an icon, which indicates features of the alternative path. The path information 504 which may be displayed herein includes: (1) path-finding conditions, estimated time and cost of alternative paths; (2) names of districts of municipalities through which alternative paths run; (3) names of roads and intersections along which alternative paths run; (4) names of toll roads, bridges, tunnels, slopes, etc. along which alternative paths run; (5) features of districts, such as urban areas and secluded places in the mountains, through which alternative paths run; (6) names, types and their numbers of the features, such as stations, public facilities and parks, located along alternative paths; (7) information on traffic restrictions such as speed limits and suspension effected for alternative paths; (8) information on current and anticipated traffic conditions, such as congestion or jam, on alternative paths; and (9) information on weathers and/or road surfaces in districts through which alternative paths run.

The showing of the path information 504 as enumerated above in the navigation screen 500 allows the driver to select a path in a more adequate manner conformable to circumstances.

Assuming that the display 105 of the navigation terminal 10 shows a navigation screen 500 as illustrated in FIG. 5 when the vehicle comes near the branch point 503 at which the navigating path 501 and the alternative path 502 meet, and that the driver makes a turn to let the vehicle run along the alternative path 502, the controller 101 detects the change of the path being traveled by the vehicle, changes the top-priority path-finding condition so that the priority assigned to a path-finding condition based on which the alternative path 502 has been found is changed into the top-priority, and changes the path 502 which has been an alternative path into a new navigating path while proceeding to find at least one new alternative path associated with the new navigating path.

On the other hand, assuming that the driver continues to let the vehicle run along the navigating path 501, the alternative path(s) should be subject to change, and thus the controller 101 does not change the top-priority path-finding condition but likewise proceeds to find at least one new alternative path associated with the new navigating path. Alternatively, assuming that the driver lets the vehicle run along a path other than the navigating and alternative paths 501, 502, the controller 101 proceeds with an updating path-finding operation to find a new navigating path and at least one new alternative path without changing priorities of the path-finding conditions including the top-priority path-finding condition.

As described above, whichever path the driver chooses, the navigation terminal 10 can present a navigating path and at least one alternative path to the driver. The driver can change the top-priority path-finding condition without performing any manipulation, by entering an alternative path as appropriate. That is, the driver can automatically make preferable settings at will, so that a path which suits the needs or preferences of the driver will be suggested, such as a path using a toll road, or a path without using a toll road.

Figure 6:
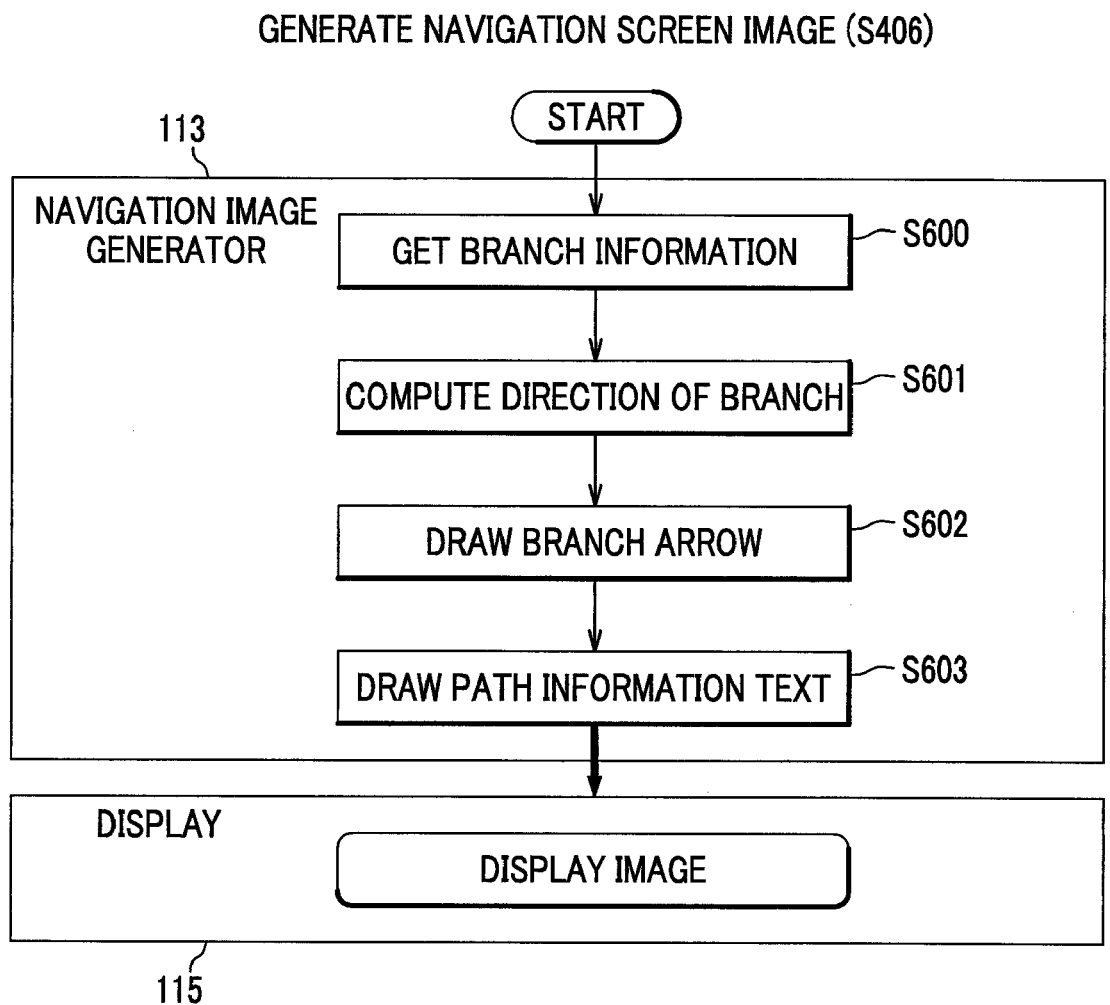
FIG. 6 is a schematic diagram showing an example of a detailed process flow of a navigation image generation step in a navigation image generator for displaying a navigation screen according to an exemplary embodiment of the present invention.

FIG. 6 is a schematic diagram showing an example of a detailed process flow of the "Generate navigation screen image" process (step S406) in the navigation image generator 113 for displaying a navigation screen 500.

As shown in FIG. 6, the controller 101 first executes a "Get branch information" process (step S600) in the navigation image generator 113 to search the map data stored in the map data memory 102 for information on relative positions of adjacent intersections connected with each other among intersections corresponding to branch points to be displayed on the navigation screen 500. This information as retrieved from the navigation image generator 113 will be referred to as "branch information" hereinbelow. The controller 101 then executes a "Compute direction of branch" process (step S601) in the navigation image generator 113 to work out a direction in which each alternative path branches off, based on the branch information as retrieved in the preceding step and information on the navigating path and the alternative path. This direction in which each alternative path branches off will be referred to as "direction of branch" hereinbelow. The direction of branch to be determined in this step includes, at the least, the side, i.e., either right or left, to which the alternative path branches off at the branch point, with respect to the road (navigating path) to be traveled by the vehicle. Next, the controller 101 executes a "Draw branch arrow" process (step S602) in the navigation image generator 113 to draw an arrow or any other mark indicating the direction of branch for the alternative path, based on the direction of branch as determined in the preceding step. Lastly, the controller 101 executes a "Draw path information text" process (step S603) in the navigation image generator 113 to draw a predetermined text (representing path information of the relevant alternative path) near the "branch arrow" as drawn in the preceding step.

Figure 7:
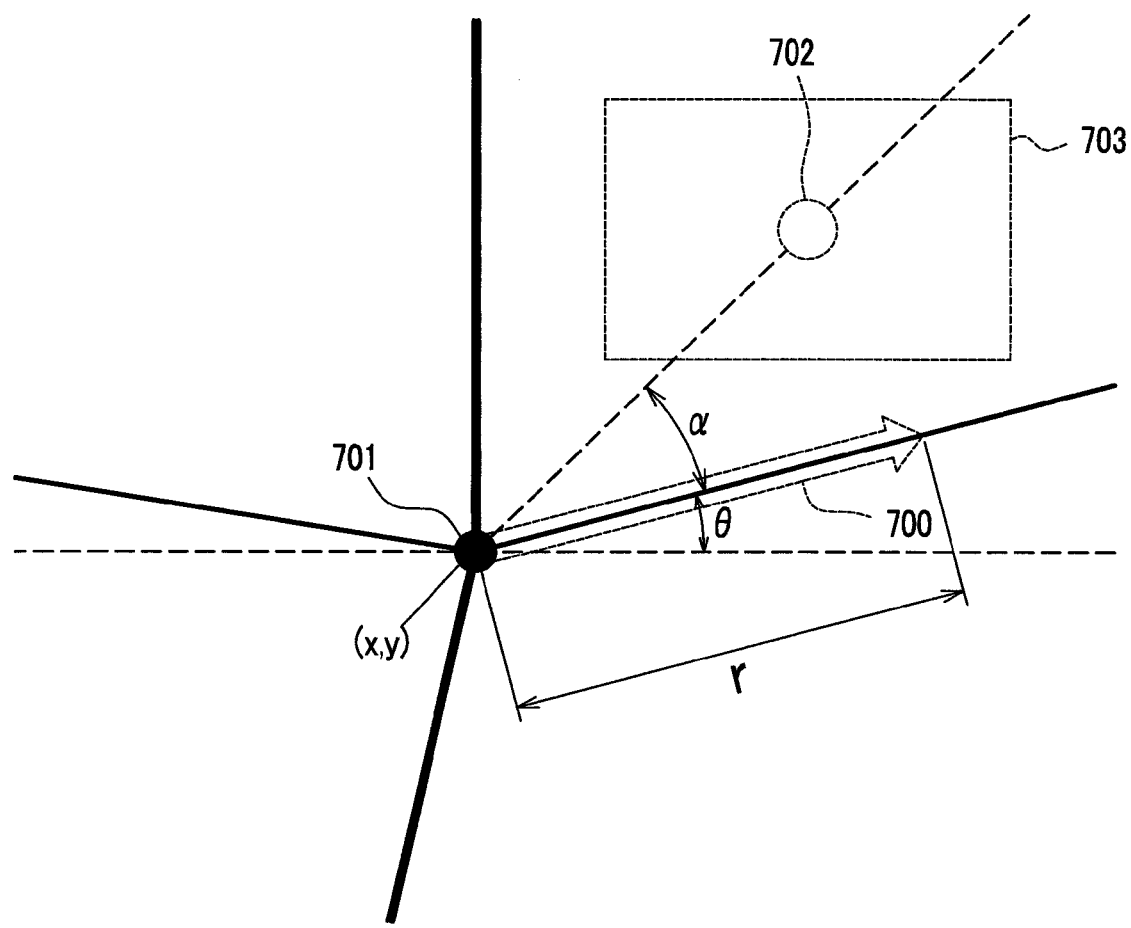
FIG. 7 is a diagram showing an example of a method of drawing a path information text drawn in a path information text drawing step by the navigation image generator according to an exemplary embodiment of the present invention.

FIG. 7 is a diagram showing an example of a method of drawing a path information text drawn in the "Draw path information text" process (step S603).

As shown in FIG. 7, a text box 703 in which the path information is to be drawn in this embodiment is positioned with a center thereof aligned with a point 702 which is in the coordinates (x+r·cos(θ+α),y+r·sin(θ+α)) where the length of the arrow 700 indicating the direction of branch of an alternative path is r, the direction of branch indicated by the arrow 700 is θ, and the coordinates of the branch point 701 is (x,y). Herein, the angle θ indicative of the direction of branch is taken with respect to a straight line extending horizontally (in x-axis direction) from the branch point 701 to the right. Denoted by α is an angle with respect to the branch arrow 700. Assuming for example that α is set at an acute angle approximately in a range of 30 degree to 45 degree, the path information text is always drawn near the relevant arrow 700, so that relevance of the text to the arrow is made readily recognizable.

The way of showing an alternative path in the navigation screen 500 as illustrated in FIG. 5 adopts a method by which a branch is displayed in the same screen 500 in which an ordinary map is shown, and thus the navigating path and at least alternative path can be displayed together in a compact fashion even in a limited area of the screen provided in the display 105 of the navigation terminal 10. Further, the number of process steps (or amount of computations/processing) required for generating a display screen image can be made smaller, and thus a burden placed on a processing performance of the controller 101 can be made smaller, with the result that an inexpensive central processing unit (CPU) with a limited processing power can be used therefor.

FIG. 8 is a diagram showing a second display example of the navigation screen displayed in the display 105 of the navigation terminal 10 according to the present embodiment. As shown in FIG. 8, in this example of the navigation screen 800, one navigating path and alternative paths from the current position to the destination, and their branch points are shown in the form of a simplified diagram such that they can be grasped intuitively.

The simplified diagram has the following characteristics. First, the navigating path is represented by a straight line running at a center of the screen 800, with the current position (the position of the vehicle in which the navigation terminal 10 is installed) located at a lower end point 801 thereof and the destination is located at an upper end point 802. Alternative paths are indicated by lines branching off from the straight line. The freeway and part with congestion are distinctively represented by their colors and/or line types different from each other.

In the navigation screen 800, the freeway junctions and the branch points of the paths may be represented by marks 803 shaped for example like a circle as illustrated. Moreover, the navigation screen 800 includes, as is the case with the example shown in FIG. 5, path information 804 such as a message describing features of each alternative path. Besides the time required (arrival time) and travel expenses (cost) of each alternative path, etc., the path information 804 may include congestion statuses, stores along the path, the number of signals along the path, and the number of branch points at which the vehicle turns right (or left) across the opposite lane along the path.

Although not shown in FIG. 8, notable intersections in navigating or alternative paths, facilities or features, etc. such as a service area located along the paths, and so forth may be displayed using a mark, an icon or the like. The position of such a mark or an icon displayed in the navigation screen 800 is determined such that an interior division point ratio, as calculated by (Distance from Origin:Distance to Destination), of the feature in a real map is retained in a simplified map. Alternatively, since the location of the feature is a certain aspect of information characterizing the path, the position in which the feature is located (hereinafter referred to as "characteristic point") may be displayed in a manner similar to the branch point.

The navigation screen 800 which shows navigating and alternative paths in a simplified diagram as shown in FIG. 8 is so designed to make it easier for the driver to intuitively grasp the distinction and characteristics of each path. Accordingly, the driver can easily make a comparison between the navigating path and the alternative paths, so that he/she can select a more adequate path.

Figure 9:
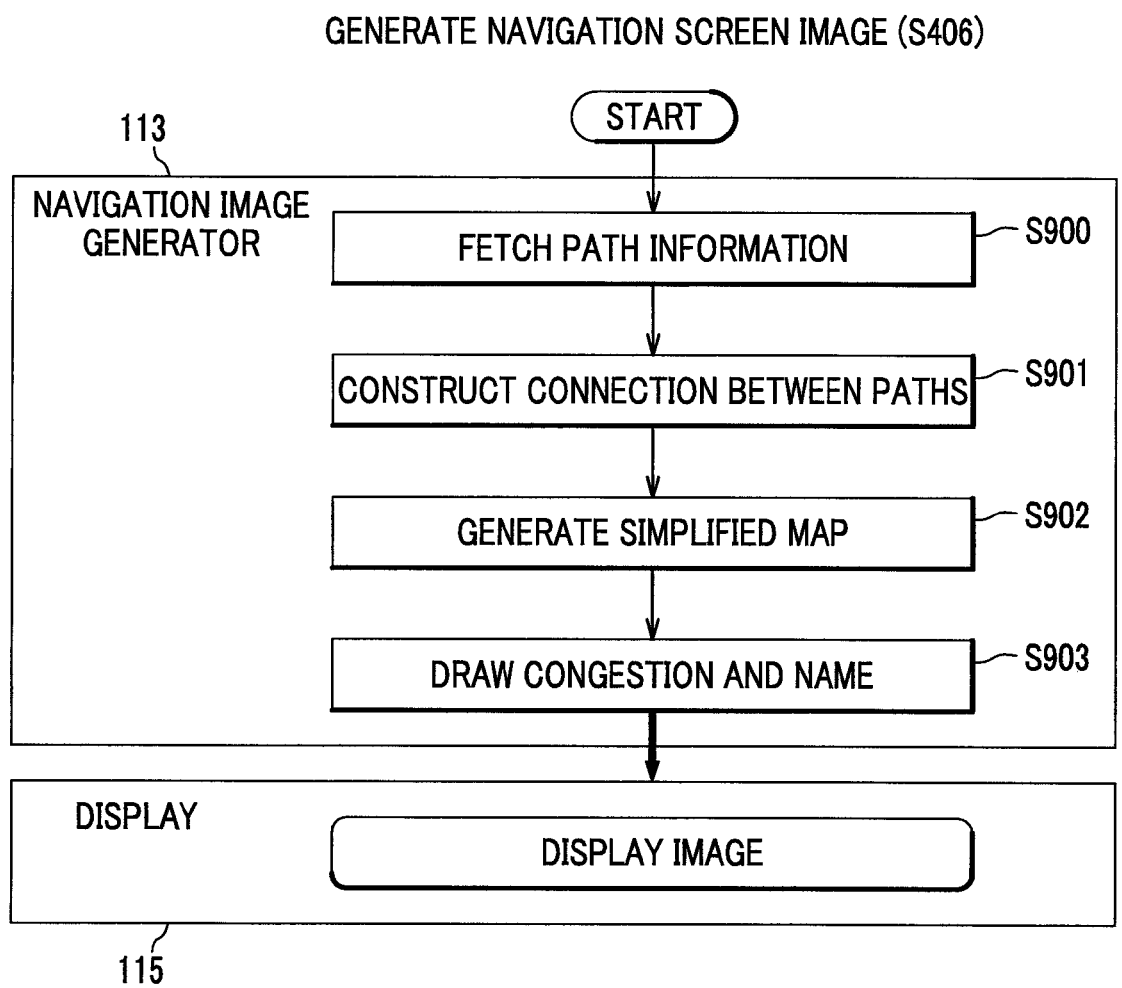
FIG. 9 is a schematic diagram showing another example of the detailed process flow of the navigation image generation step in the navigation image generator for displaying a navigation screen according to an exemplary embodiment of the present invention.

FIG. 9 is a schematic diagram showing an example of a detailed process flow of the "Generate navigation screen image" process (step S406) in the navigation image generator 113 for displaying a navigation screen 800.

As shown in FIG. 9, the controller 101 first executes a "Fetch path information" process (step S900) in the navigation image generator 113 to obtain the result of path-finding operation under a plurality of prioritized path-finding conditions, i.e., to fetch "path information" on the navigating and alternative paths. The path information is, as described above, obtained in the form of an array of identifiers of roads and junctions through which the path runs. The path information may include information on a plurality of alternative paths.

The controller 101 then executes a "Construct connection between paths" process (step S901) in the navigation image generator 113 to extract branch points at which the navigating path branches off to at least one alternative path. To be more specific, the controller 101 (navigation image generator 113) is configured to compare identifiers of roads and junctions included in the navigating path with those included in each alternative path to extract portions common therebetween, so that the branch points can be detected. At this stage, the controller 101 (navigation image generator 113) is further configured to extract characteristic points included in the navigating and alternative paths respectively, in accordance with a predetermined rule. Also, at this stage, information concerning the names of roads, the names of facilities or stores along the path, traffic congestion statuses, and so forth is obtained as information associated with the characteristic points of each path.

Next, the controller 101 executes a "Generate simplified map" process (step S902) in the navigation image generator 113 to arrange the branch points and characteristic points obtained in the preceding step on a lattice arrangement having a predetermined shape, thereby generating a simplified map in which the navigating and alternative paths are shown in a diagram. The generation will be described later in detail.

Next, the controller 101 executes a "Draw congestion and name" process (step S903) to represent information associated with the branch points and characteristic points along the path using a text or an icon, so that relevant information is shown near the corresponding branch points and characteristic points along the path which are displayed in the simplified map. For example, the name of each road, information on each facility or store along the road, and the like may be represented by a text and/or an icon, etc. arranged adjacent to the road. Any congested portion in the road may be represented by superposing on the road a segment in a color different from that of the road.

By representing information in such a way as described above, information in a text form and/or with the help of an icon can be displayed so that the information such as the congestion statuses and the name of the road, the names of facilities or stores along the road, and the like can be distinctly associated with the pertinent road included in the navigating or alternative path. It is to be appreciated that indication of the path information may be given so as to minimize an overlapped portion of the indication of the path information which would possibly hide the showing of a path segment, by properly shifting the position of the indication.

Figure 10:
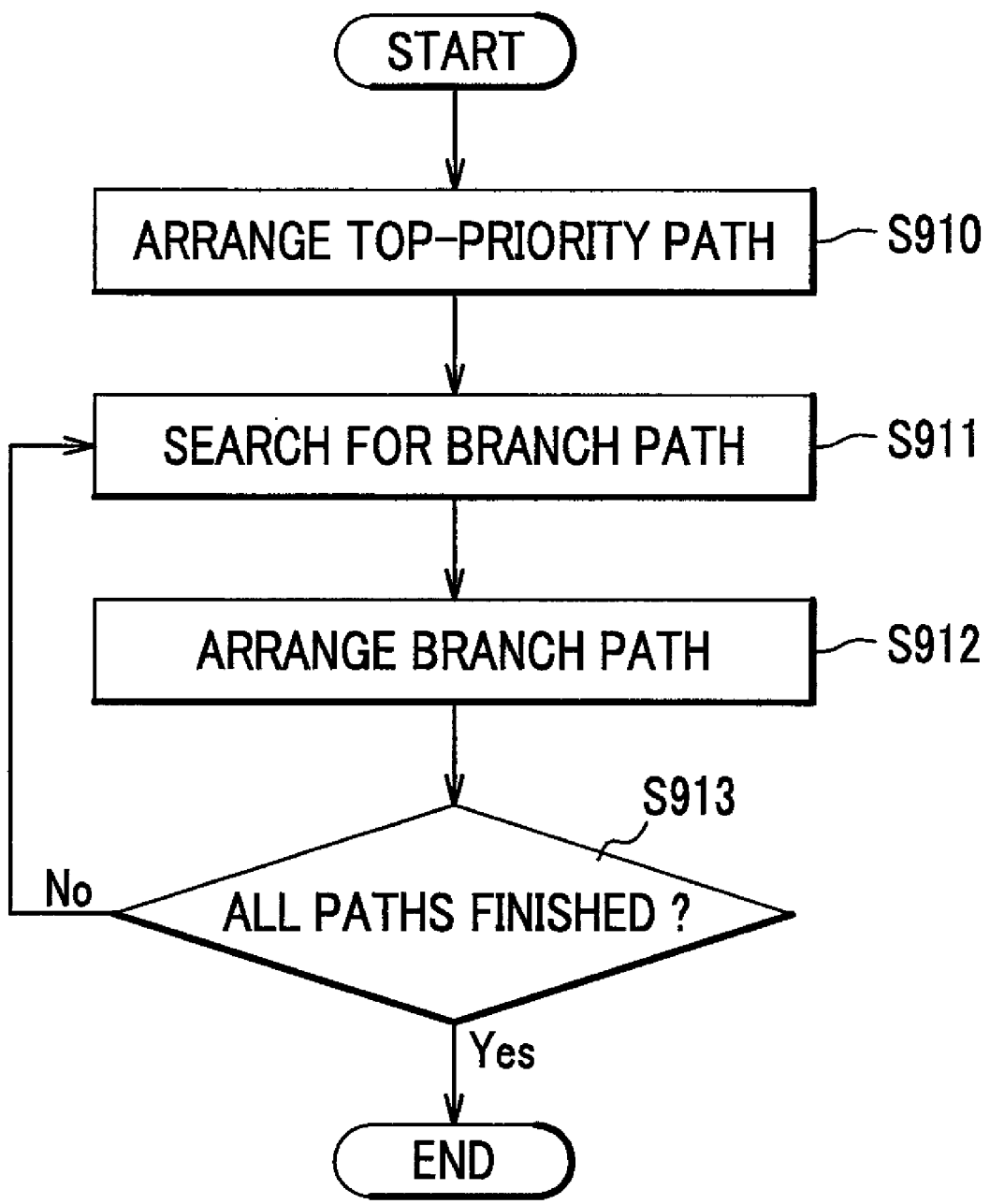
FIG. 10 is a schematic diagram showing an example of a detailed process flow of a simplified map generation step in FIG. 9.

FIG. 10 is a schematic diagram showing an example of a detailed process flow of the "Generate simplified map" process (step S902) in FIG. 9.

As shown in FIG. 10, the controller 101 (navigation image generator 113) first executes an "Arrange top-priority path" process (step S910) to arrange branch points on the navigating path in a manner that makes the navigating path into a readily recognizable shape such as a straight line. The controller 101 (navigation image generator 113) then executes a "Search for branch path" process (step S911) to search for paths each extending from a branch point on the navigating path to a point at which the path merges again with the navigating path, and select one path among the paths found. The path selected in this process will be hereinafter referred to as "branch path".

Next, the controller 110 (navigation image generator 113) executes an "Arrange branch path" process (step S912) to arrange the selected branch path in parallel with the navigating path arranged in advance. In this embodiment, the branch path branching off from its original (navigating) path to the right side relative to the original path is arranged on the right side, while the branch path branching off from its original path to the left side relative to the original path is arranged on the left side.

Next, the controller 101 (navigation image generator 113) is configured to determine whether or not the "Search for branch path" process (step S911) and the "Arrange branch path" process (step S912) have been finished for all branch paths in step S913. If it is determined (No in step S913) that the processes in steps S911 and S912 have not been finished for all the branch paths, then the processes are repeated, while if it is determined (Yes in step S913) that the processes in steps S911 and S912 have been finished for all the branch paths, then the "Generate simplified map" process (step S902) exits.

Figure 11:
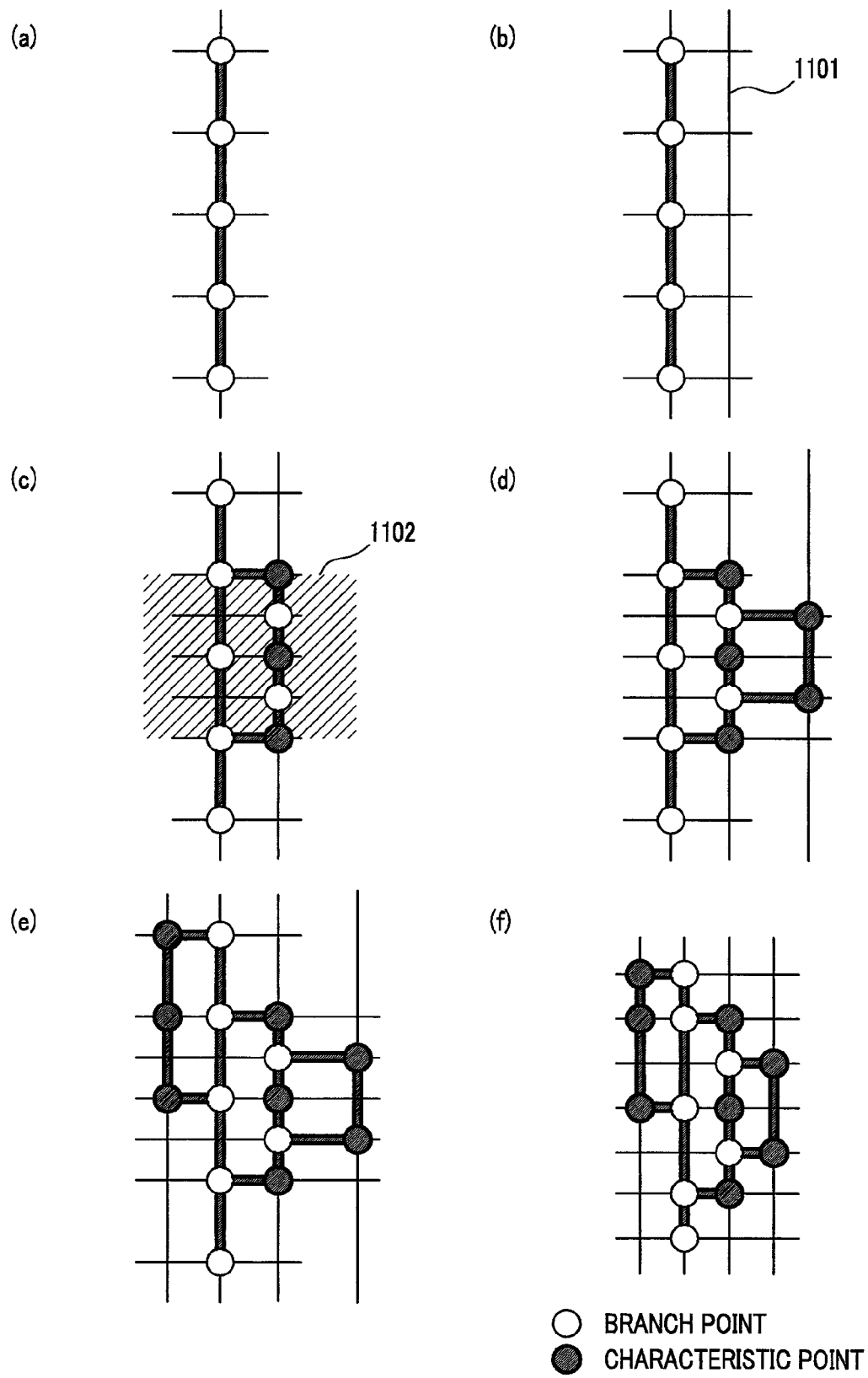
FIG. 11 is a schematic diagram showing process steps of generating a simplified map in the simplified map generation step according to an exemplary embodiment of the present invention.

FIG. 11 is a schematic diagram for more specifically explaining process steps of generating a simplified map in the "Generate simplified map" process (step S902).

First, when the controller 101 (navigation image generator 113) executes the "Arrange top-priority path" process (step S910), branch points on a navigating path are arranged on lattice points of a one-dimensional lattice (see FIG. 11(a)). It is however to be understood that the one-dimensional lattice as adopted herein may be extendible to a two-dimensional lattice in a subsequent step, and that a new lattice point may be additionally inserted between adjacent lattice points in the extended two-dimensional lattice on an as-needed basis so as to arrange a new branch path or characteristic point. The lattice is not necessarily composed of straight lines intersecting at right angles as illustrated, and may be configured otherwise as long as such configuration provides an easy-to-recognize display representation of navigating and alternative paths for the driver.

Next, the controller 101 (navigation image generator 113) executes the "Search for branch path" process (step S911) in which the navigating path is traced from the current position to the destination until the first branch point is found. Once the first branch point is found, a determination is made as to whether the direction of branch is, right or left, and a new lattice 1101 is added to either of the right or left according to the determination result (see FIG. 11(b)).

Next, the controller 101 (navigation image generator 113) executes the "Arrange branch path" process (step S912) in which the branch points and the feature points included in the branch path branched off from the aforementioned first branch point are arranged on the added lattice 1101 (see FIG. 11(c)). In this process, one or more new lattice points are additionally inserted on an as-needed basis in a lattice region (hatched area 1102 in FIG. 11(c)) from the branch point to the meeting point.

Thereafter, the controller 101 (navigation image generator 113) repeatedly executes the "Search for branch path" process (step S911) and the "Arrange branch path" process (step S912) to perform the same operations for alternative paths which branch off from the branch points on the lattice. To illustrate, FIG. 11(d) is a diagram showing an example in which is arranged a second branch path branching off from a branch point on the first branch path arranged in FIG. 11(c). FIG. 11(e) is a diagram showing an example in which is arranged a third branch path branching off from a second branch point on the original navigating path.

Lastly, the controller 101 (navigation image generator 113) adjusts the lattice so that the lattice points are spaced uniformly (see FIG. 11(f)), and then causes the display 105 to show a simplified map which contains navigating and branch paths generated on the lattice.

Figure 12:
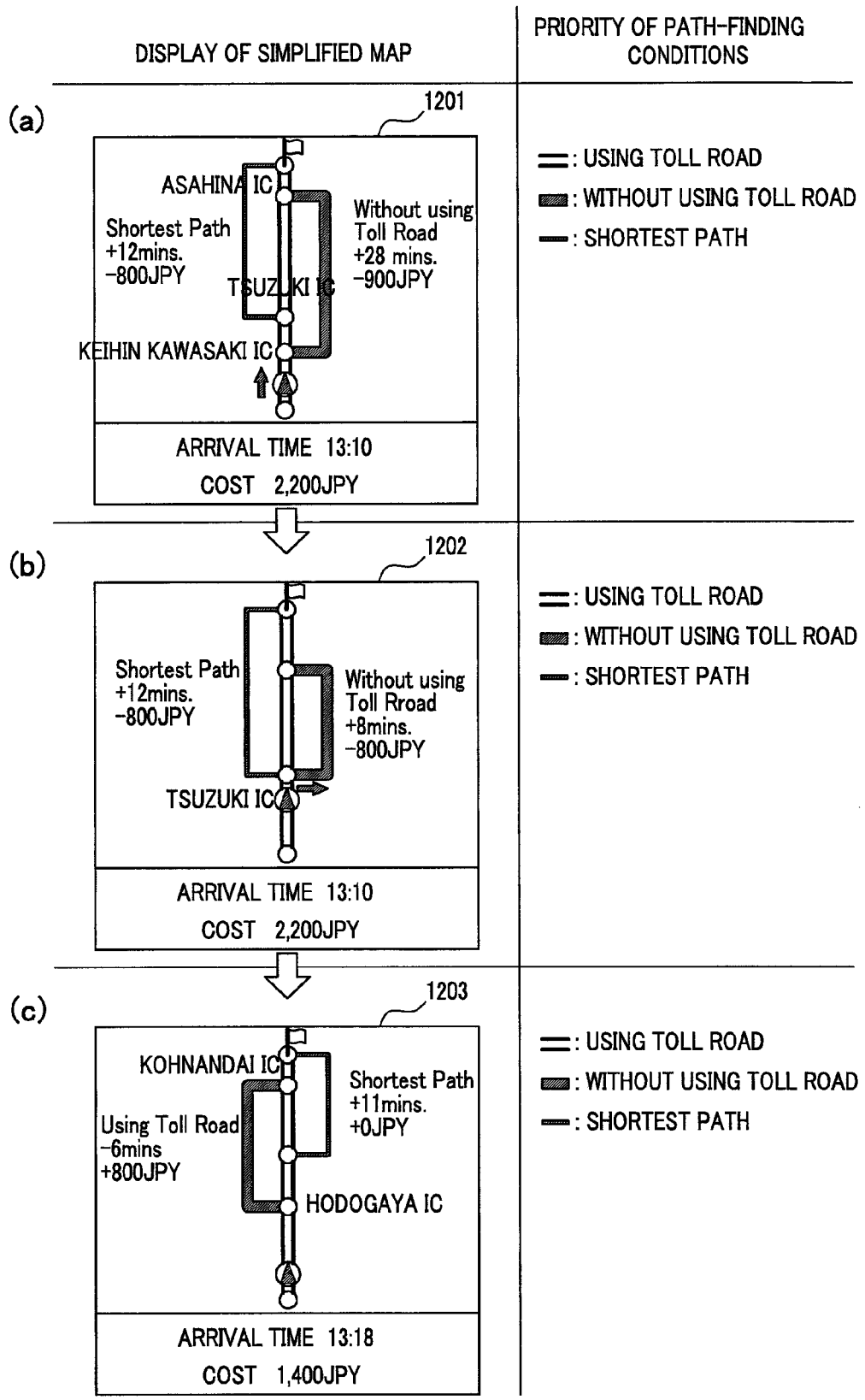
FIG. 12 is a schematic diagram for specifically illustrating a change in display representations in the navigation screen shown in FIG. 8 as the vehicle is being driven.

FIG. 12 is a schematic diagram for specifically illustrating a change in display representations in the navigation screen shown in FIG. 8 as the vehicle is being driven. In this example, it is assumed that three path-finding conditions have been set which are: (1) find a path requiring a shortest time and using a toll road (hereinafter referred to as USING TOLL ROAD); (2) find a path requiring a shortest time without using a toll road (hereinafter referred to as WITHOUT USING TOLL ROAD); and (3) find a path along which the vehicle runs a shortest distance to a destination (hereinafter referred to as SHORTEST PATH). Priorities assigned to these path-finding conditions are as follows: the top priority is assigned to USING TOLL ROAD, the second highest priority to WITHOUT USING TOLL ROAD, and the third (last) priority to SHORTEST PATH.

Assume that the vehicle in which the navigating terminal 10 is installed is running along a toll road, following a navigating path displayed under the conditions as described above. The display 105 shows a simplified map 1201 as shown in FIG. 12(a). When the vehicle running along the toll road comes near a branch point (KEIHIN KAWASAKI IC in the illustrated example) at which the navigating path branches off to an alternative path (a path WITHOUT USING TOLL ROAD), the driver can choose whether he/she continues to drive the toll road or goes out of the toll road. In this example, it is assumed that the vehicle continues to run along the toll road.

In this instance, when the vehicle passes through the branch point, an updated path-finding operation for alternative paths is performed under the conditions of WITHOUT USING TOLL ROAD, and the result is displayed as shown in the simplified map 1202 of FIG. 12(b). Thereafter when the vehicle comes near the next branch point TSUZUKI IC, the driver can again choose whether he/she continues to drive the toll road or goes out of the toll road. In this example, it is assumed that the vehicle has gone out of the toll road.

In this instance, the controller 101 executes the "Update status" process (step S205), to thereby determine that the vehicle has gone out of the navigating path, and executes the "Change path-finding conditions" process (step S206), to thereby change the priorities assigned to the path-finding conditions. To be more specific, thereafter, the top priority is assigned to WITHOUT USING TOLL ROAD, and the display 105 shows as a new navigating path the path found on the basis of the WITHOUT USING TOLL ROAD condition, as shown in the simplified map 1203 of FIG. 12(c).

Figure 13:
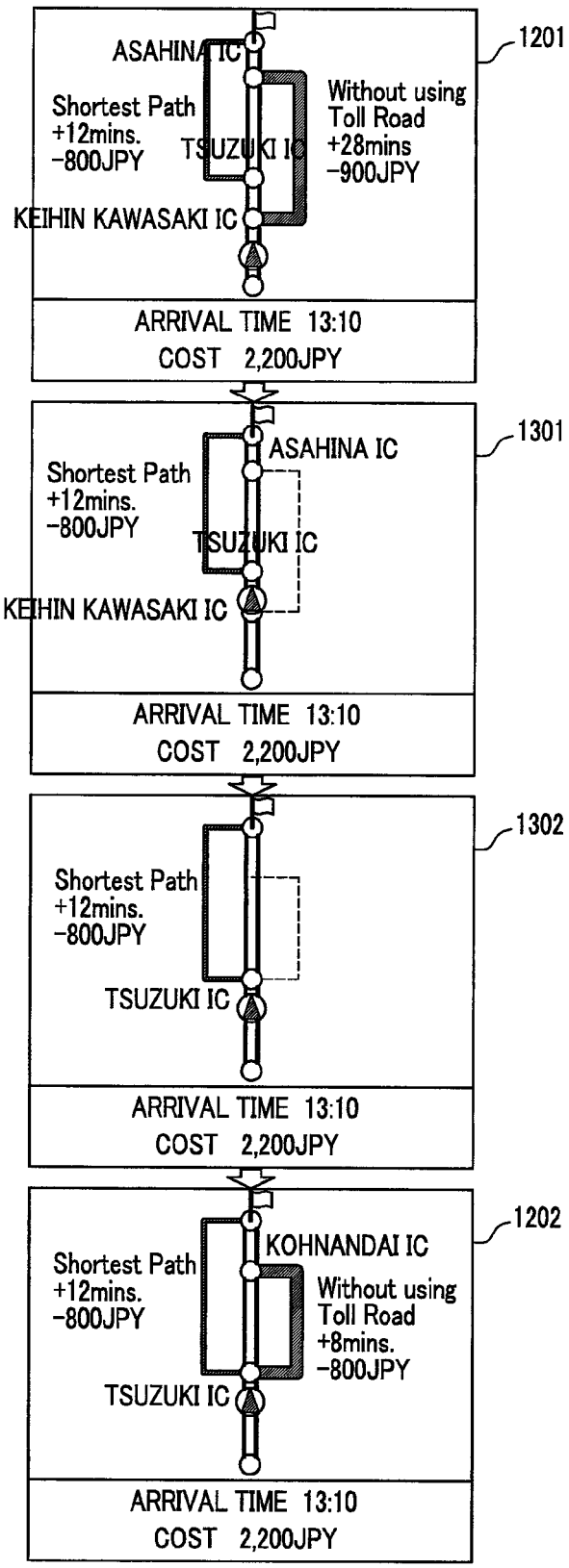
FIG. 13 is a schematic diagram for illustrating a transition in display representations in the navigation screen displayed as the vehicle passes through a branch point in the navigation apparatus according to an exemplary embodiment of the present invention.

FIG. 13 is a schematic diagram illustrating a transition in display representations in the navigation screen displayed as the vehicle passes through a branch point.

In the display representations of the navigating and alternative paths in the simplified map as explained with reference to FIG. 8 and subsequent drawings, if the new navigating and alternative paths are shown immediately after the vehicle has passed through a branch point, the driver may, for example, lose his/her grasp of the relationship or correspondence between the navigating or alternative paths before and after the vehicle passes through the branch point, or may nevertheless be confused by the abrupt change. Therefore, in this embodiment, the transition in display representations in the navigation screen is configured to avoid directly switching from the screen before the vehicle passes through the branch point to the screen after the vehicle passes through the branch point, and to have transient screens inserted between these two screens, so that the driver would never be confused.

As shown in FIG. 13, before the vehicle passes through a branch point (KEIHIN KAWASAKI IC in the illustrated example), for example, the navigation screen 1201 is shown. When the vehicle passes through the branch point, the controller 101 extracts at least one alternative path branching off from the navigating path at that branch point which the vehicle has just passed through, and shows a navigation screen 1301 in which indication of the extracted alternative path is erased. The at least one alternative path branching off from the navigating path at the branch point which the vehicle has just passed through will be hereinafter referred to as "undisplayed path" in that the at least one alternative path is not displayed in the navigation screen 1301. Then, the showing of the navigation screen 1301 is continued for a while. This allows the driver to confirm that the vehicle has passed through the branch point.

Thereafter, the controller 101 is configured to switch the showing of the navigating and alternative paths to one as illustrated in a navigation path 1302, in which a newly found alternative path(s) however is not displayed yet. After a lapse of a predetermined period of time, the controller 101 causes the display 105 to show the navigation screen 1202 in which the newly found alternative path(s) is displayed.

As described above, the illustrated embodiment is configured to avoid immediately displaying the navigation screen 1202 in which at least one updated alternative path is shown, and to display first and second screens 1301, 1302, respectively for a while before displaying the navigation screen 1202: the first screen 1301 in which at least one alternative path branching off from the navigating path at the branch point which the vehicle has just passed through is erased from the paths displayed before the vehicle passes through the branch point; and the second screen 1302 in which updated navigating and alternative paths found under the conditions established after the vehicle passes through the branch point is shown but at least one newly found alternative path is not shown yet. Thus, the driver is allowed to easily grasp the relationship or correspondence between the navigating or alternative paths displayed before and after the vehicle passes through the branch point.

Figure 14:
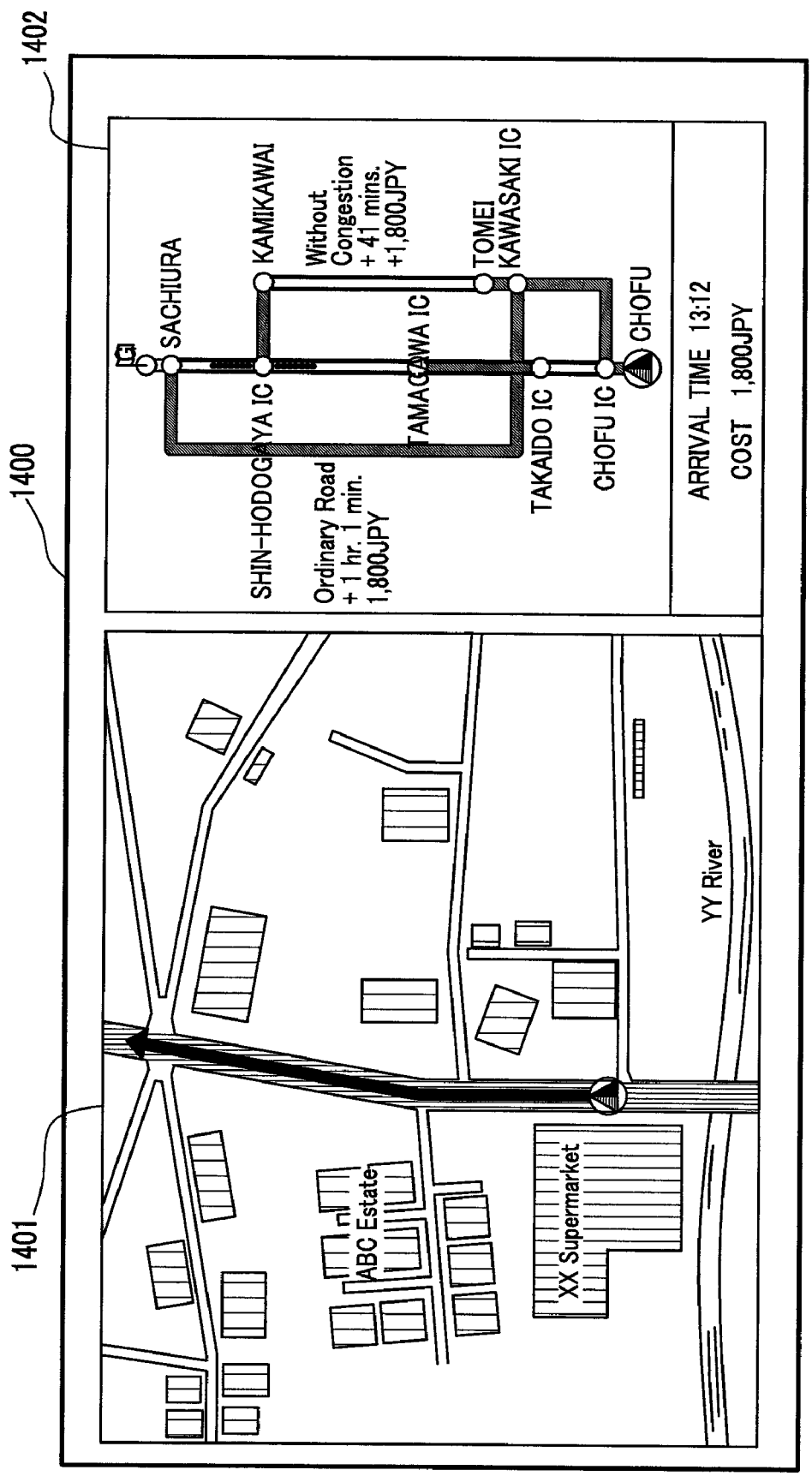
FIG. 14 is a diagram showing a third display example of the navigation screen displayed in the display of the navigation apparatus according to an exemplary embodiment of the present invention.

FIG. 14 is a diagram showing a third display example of the navigation screen displayed in the display 105 of the navigation terminal 10 according to the present embodiment. In this example, the display screen of the display 105 is divided into two areas: one for displaying a navigation screen 1401 in which a navigating path is shown on a map in such a manner as known in the art; and the other for displaying a screen 1402 for a simplified map in which navigating and alternative paths are shown diagrammatically. This makes it possible to provide at least one alternative path shown in a simplified diagram as in the second display example according to the present embodiment, while providing a conventional navigation screen, at the same time. It is to be understood that at least one alternative path may be shown in the navigation screen 1401 of FIG. 14 as is the case shown in FIG. 5. Furthermore, the screen 1402 for a simplified map may not always be displayed, and the display screen may be configured to be divided into two at a time when the vehicle comes near a branch point.

Figure 15:
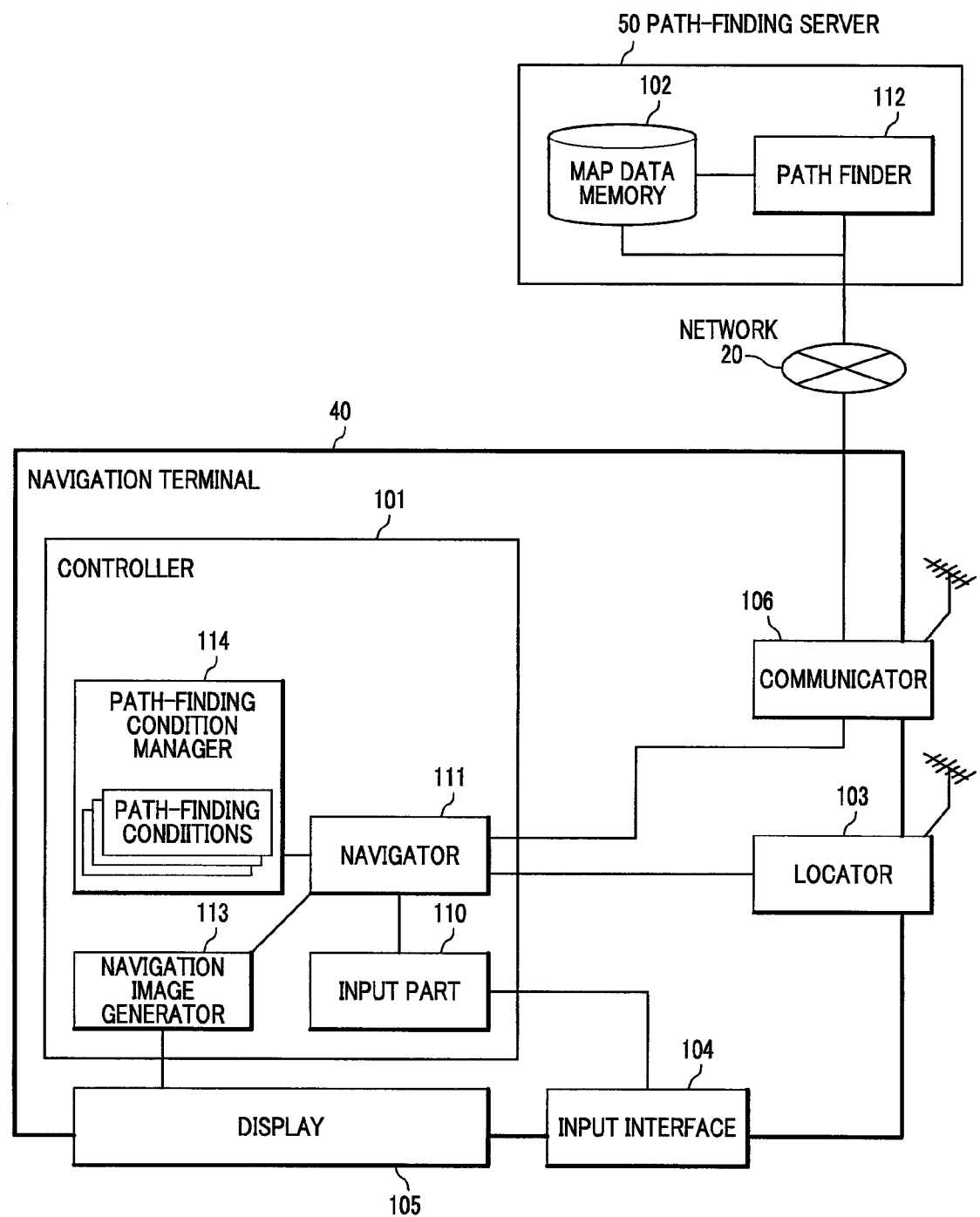
FIG. 15 is a block diagram showing another exemplified structure of the navigation apparatus according to an exemplary embodiment of the present invention.

FIG. 15 is a block diagram showing another exemplified structure of the navigation terminal 40 (navigation apparatus) according to an exemplary embodiment of the present invention. In this embodiment, the navigation terminal 40 includes neither a path finder 112 nor a map data memory 102. Instead provided is a path-finding server 50 which includes a path finder 112 and a map data memory 102. The navigation terminal 40 is connected with the path-finding server 50 via a network 20, and the path-finding server 50 is configured to receive a request from the navigation terminal 40, and to perform path-finding operation for navigating and alternative paths in response thereto, and to send the result of path-finding operation back to the navigation terminal 40.

The navigation terminal 40 configured as described above can realize an alleviated burden placed on the processing of the controller 101 because the path finder 112 and the map data memory 102 are not included, and thus can be miniaturized and embodied in a compact body, and can reduce power consumption therefor. Moreover, according to the embodiment as illustrated in FIG. 5 in which the navigation screen shows at least one alternative path in a simplified manner, a smaller display can be employed for the display 105, and thus the navigation terminal 40 may be further miniaturized and the power consumption may be further reduced.

As described above, according to the exemplified embodiments of the present invention, the display 105 of the navigation terminals 10, 40 always show a navigating path and at least one alternative path found on the basis of path-finding conditions different from that based on which the navigating path is found, with the exception of a short period of time during transition in display representations as described with reference to FIG. 13. Accordingly, the navigation terminals 10, 40 can achieve a change in paths and a change in the top-priority path-finding conditions in accordance with the preferences of the driver at a time when the driver changes the path to a path found on the basis of path-finding conditions different from that based on which the current navigating path is found, without manipulating the navigating terminal 10, 40.

It is contemplated that numerous modifications may be made to the exemplary embodiments of the invention without departing from the spirit and scope of the embodiments of the present invention as defined in the following claims.

What is claimed is:

1. A navigation apparatus installed in a vehicle, comprising:
   a display for showing information graphically;
   an input interface for receiving an instruction from an operator;
   a locator configured to identify a current position of the vehicle; and
   a controller configured to hold a plurality of first path-finding conditions to which priorities are assigned and perform:
   a first process for generating first path information based on the plurality of first path-finding conditions,
   a second process for generating a navigation screen including first and second path information and displaying the navigation screen on the display, and
   a third process for changing the priorities assigned to the plurality of first path-finding conditions based on the current position identified by the locator and generating a plurality of second path-finding conditions, wherein
   the first process finds a plurality of paths from a first current position of the vehicle identified by the locator to a destination input by the operator and received through the input interface based on the plurality of first path-finding conditions respectively, and stores a path found on the basis of a top-priority first path-finding condition of the plurality of first path-finding conditions and the top priority first path-finding condition associated with each other as first path information;
   the second process acquires a second current position of the vehicle identified by the locator after the first process, stores a path from the second current position of the vehicle to the destination found based on a first path-finding condition which is not the top-priority first-path condition and the first path-finding condition which is not the top-priority first-path condition as second path information, and displays path information including at least a part of the first and second path information on the display; and
   the third process determines whether or not the second current position is on the path stored as the first path information and whether or not the second current position is on the path stored as the second path information, generates a plurality of second path-finding conditions by changing a priority assigned to the first path-finding condition stored as the second path information to a top priority and a priority assigned to the top-priority first path-finding condition to a priority other than the top priority when the second current position is not on the path stored as the first path information and is on the path stored as the second path information, and overwrites the first path information with the second path information, wherein
   the controller automatically performs the second process and the third process repeatedly every time the vehicle passes a branch point of the path stored as the first path information and the path stored as the second path information.

2. A navigation apparatus according to claim 1, wherein the second process is performed in a case where the second current position is at a position after a branch point at which the path stored as the first path information branches off to the path stored as the second path information when determining whether or not the second current position is on the path stored as the first path information.

3. A navigation apparatus according to claim 1, wherein
   when displaying the path information including at least the part of the first and second path information on the display,
   the controller generates a display image in which the path stored as the first path information is shown in a substantially straight line at a center of the display image, and the path stored as the second path information branching off from the path stored in the first path information to one side relative to the path stored as the first path information is shown on the one side in parallel with the path stored as the first path information in the display image.

4. A navigation apparatus according to claim 1, wherein
   when displaying the path information including at least the part of the first and second path information on the display,
   the controller generates a display image in which besides the path stored as the first path information and the path stored as the second path information, path information about a feature of the path stored as the second path information is shown near a branch point at which the path stored as the second path information branches off from the path stored as the first path information.

5. A navigation apparatus according to claim 3, wherein the path information about the feature of the path stored as the second path information comprises at least one of an expected arrival time at which the vehicle running along the path stored as the second path information is expected to arrive at the destination, travel expenses to be incurred when the vehicle runs along the path stored as the second path information to the destination, and information on predetermined features located along the path stored as the second path information.

6. A navigation apparatus according to claim 1, wherein the controller generates a display image in which traffic congestion information is shown for at least one of the path stored as the first path information and the path stored as the second path information.

7. A navigation apparatus according to claim 1, wherein the path stored as the first path information is shown in a substantially straight line at a center of the display image, and the path stored as the second path information branching off from the path stored as the first path information to one side relative to the path stored as the first path information is shown on the one side in parallel with the path stored as the first path information in the display image.

8. A navigation apparatus according to claim 1, wherein
   the controller performs the second process and the third process repeatedly, and
   when detecting the second current position passes a branch point at which the path stored as the second path information branches off from the path stored as the first path information,
   before a predetermined time is elapsed,
   displays at least one path containing the second current position among the path stored as the first path information and the path stored as the second path information which have been generated before the second current position passes the branch point,
   stops displaying of the path stored as the first path information and the path stored as the second path information which have been generated before the second current position passes the branch point and do not contain the second current position, stops displaying of the path stored as the second path information generated after the second current position passes the branch point, and after the predetermined time is elapsed, displays the path information including at least the part of the first and second path information.

* * * * *